May 3, 1960 F. HÜBENETT 2,935,533
PROCESS FOR THE PRODUCTION OF DIALKYL SULFOXIDES
Filed Aug. 8, 1958
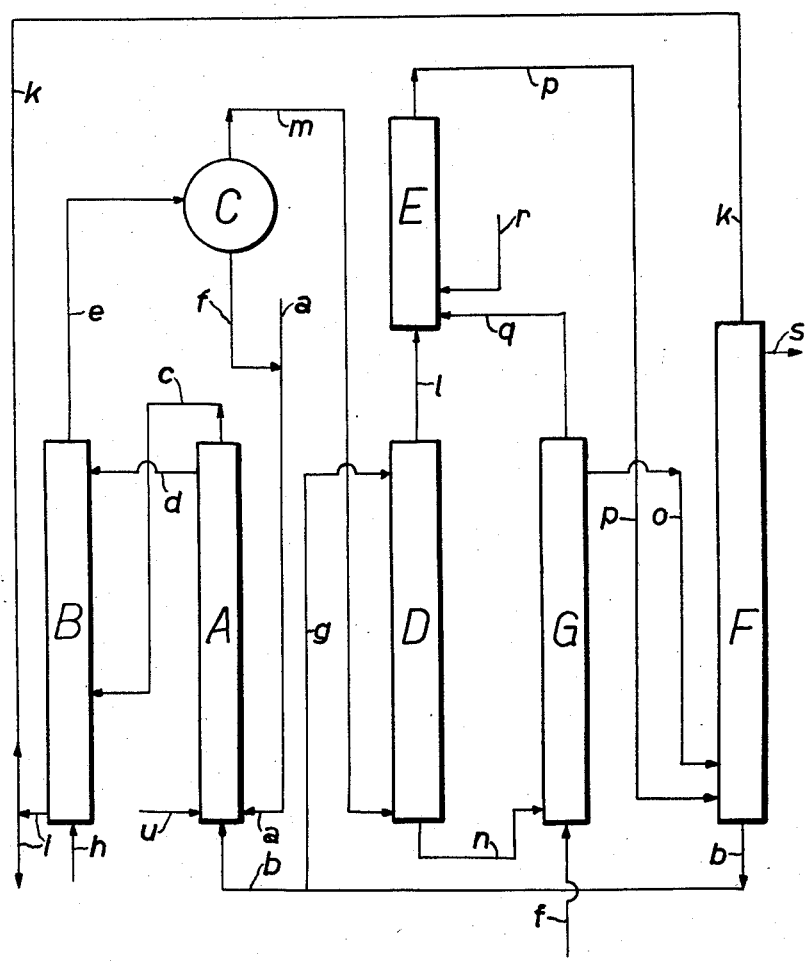
INVENTOR.
FRITZ HÜBENETT
BY
his ATTORNEYS

United States Patent Office

2,935,533
Patented May 3, 1960

2,935,533

PROCESS FOR THE PRODUCTION OF DIALKYL SULFOXIDES

Fritz Hübenett, Wesseling, Germany, assignor to Union Rheinische Braunkohlen Kraftstoff Aktiengesellschaft, Wesseling, Germany, a corporation of Germany Application August 8, 1958, Serial No. 754,108

Claims priority, application Germany August 28, 1957

1 Claim. (Cl. 260—607)

The present invention relates to a novel and improved process of producing dialkyl sulfoxides.

In copending application Ser. No. 695,966 which was filed November 12, 1957 in the name of Fritz Hübenett and Karl-Heinz Keim, there is described a process of oxidizing dialkyl sulfides to form dialkyl sulfoxides by means of a solution of nitrogen dioxide, preferably contained in the dialkyl sulfoxide obtained as reaction product. This process is carried out continuously and the oxidation solution is recovered by converting the nitrogen monoxide formed in the oxidation of the dialkyl sulfides, in a second reactor with oxygen or a gas containing oxygen, into nitrogen dioxide which is separated from the waste gases in a tower by washing with the dialkyl sulfoxide obtained in the reaction. The dialkyl sulfoxide obtained as crude product shows a high degree of purity and is free of nitrogen, especially since an excess quantity of dialkyl sulfide is applied in the reaction of the nitrogen dioxide solution to guarantee complete conversion. The excess dialkyl sulfide can easily be separated from the crude product by increasing the temperature and expelling with the gases which are passed to the oxidation step which is carried out in the gas phase.

Of course, the addition of oxygen to the waste gases containing dialkyl sulfide and NO must be performed under carefully controlled conditions to prevent the formation of explosive mixtures. For instance, the partial pressure of the dimethyl sulfide in the waste gas of the reactor wherein oxidation is carried out in the liquid phase, or of the extraction vessel, must be prevented from exceeding an upper limit. This is accomplished by maintaining a given temperature. In addition, the oxygen content of the gas mixture in the oxidation carried out in the gas phase must not at any place exceed certain values which are dependent on the dimethyl sulfide content. These conditions can easily be observed; for instance the amount of oxygen in the gas phase oxidation can be adjusted by adding oxygen in controlled quantities at different places. Nevertheless, the provision of a special control equipment is required to fulfill these conditions.

In accordance with the present invention dialkyl sulfoxide is obtained by oxidizing dialkyl sulfides with a solution of nitrogen dioxide in the dialkyl sulfoxide produced as reaction product. The solution of nitrogen dioxide in dialkyl sulfoxide is recovered by oxidizing in a second reactor the nitrogen monoxide evolved in the reaction with excess dialkyl sulfide with oxygen which is applied in an amount at least sufficient for oxidizing said nitrogen monoxide. Nitrogen dioxide is formed which is absorbed in the dialkyl sulfoxide produced. Before oxidizing the nitrogen monoxide with oxygen or a gas containing free oxygen, the dialkyl sulfide vapors entrained with the nitrogen monoxide evolved are oxidized by treatment with a solution of nitrogen dioxide in the dialkyl sulfoxide produced to form dialkyl sulfoxides which are separated off.

According to the invention, the formation of explosive gas mixtures at any place of the apparatus is rendered impossible. In addition, the reaction spaces may be of relatively small dimensions.

The process of the present invention substantially consists in that the dialkyl sulfide entrained with the waste gases originating from the liquid phase oxidation space or the extraction vessel is converted into the slightly volatile sulfoxide and thereby removed from the waste gases by oxidizing the dialkyl sulfide with a solution of nitrogen dioxide in dialkyl sulfoxide. The gas thus evolved from the dialkyl sulfide, which substantially consists of nitrogen monoxide, can be admixed without any hazards with oxygen or gases containing oxygen to reform nitrogen dioxide which is separated by washing from the waste gas with the recovery of the nitrogen dioxide required for oxidizing the sulfide. Besides, it is possible to remove the last traces of dialkyl sulfide from the end product by the use of nitrogen or another inert gas instead of oxygen; this allows of carrying out the herein described process by means of an apparatus of simple construction.

Upon removing the dialkyl sulfide vapors from the waste gases of the liquid phase reactor, which substantially consist of nitrogen monoxide, part of the nitrogen monoxide dissolves in the nitrogen dioxide-containing dialkyl sulfoxide solution as di-nitrogen trioxide. This part of nitrogen monoxide can be regenerated, preferably by treating the nitrogen dioxide-containing dialkyl sulfoxide solution in another vessel with oxygen or a gas containing free oxygen, the di-nitrogen trioxide being thereby converted to nitrogen dioxide which remains dissolved for the most part. According to a preferred embodiment of the invention, this regeneration step is accomplished by means of the gas which is subsequently used for oxidizing the nitrogen monoxide liberated from dialkyl sulfide vapors.

In order to keep the amount of dialkyl sulfoxide required for washing off the resulting nitrogen dioxide from the waste gases as low as possible and to obtain the highest possible concentration of nitrogen dioxide in the oxidation solution, the waste gases containing nitrogen dioxide are preferably washed first with the previously used and regenerated nitrogen dioxide solution and then with fresh dialkyl sulfoxide. It is advantageous to carry out this absorption in a tower by introducing the nitrogen dioxide solution into the lower part thereof and fresh dialkyl sulfoxide at the top.

The invention will now be further described with reference to the single figure of the accompanying diagrammatic drawing, which is a flow sheet of one embodiment of the apparatus to be used for carrying out the process of the invention.

An excess quantity of liquid dialkyl sulfide is fed through a pipe $a$ to a reactor A into which a solution of nitrogen dioxide in dialkyl sulfoxide is introduced through a pipe $b$. A temperature is maintained in the reactor A, for instance by cooling, which is generally near room temperature, preferably between about 20 and 45° C. The nitrogen monoxide thus evolved passes through a pipe $c$ to a separation vessel B. The partial pressure of the dialkyl sulfide entrained with the waste gas can be controlled, if this is deemed necessary, by means of a cooler interposed in pipe $c$. The reaction mixture formed in the reactor A from dialkyl sulfide and dialkyl sulfoxide passes through a pipe $d$ into the separation vessel B which is heated to such a temperature that the dialkyl sulfide can completely be removed from the sulfoxide. Besides, the reaction of any residual amounts of nitrogen dioxide is completed by the elevated temperature.

In the separation vessel B, the mixture running down e.g. over packing material or bubble trays is freed from excess dialkyl sulfide by the waste gases passed from the reactor A in countercurrent into the separation vessel B via pipe c or by an inert gas such as nitrogen introduced via a pipe h. The crude product is led off via a pipe i. The entrained dialkyl sulfoxide and the greater part of dialkyl sulfide are separated by condensation in cooler C from the gases which are led off through a pipe e, and this dialkyl sulfide is returned to the reactor A via pipes f and a.

The gas substantially consisting of nitrogen monoxide, nitrogen and some entrained dialkyl sulfide flows through a pipe m into a reactor D which, if necessary, is cooled. The dialkyl sulfide vapors contained in the gas react in the reactor D with the excess nitrogen dioxide solution introduced via a pipe g. Part of the thereby evolved nitrogen monoxide passes together with part of the gases introduced through a pipe m via a pipe l into the gas phase oxidation vessel E wherein it reacts with oxygen or a gas containing oxygen introduced through a pipe q to form nitrogen dioxide. However, a considerable amount of the nitrogen monoxide reacts with excess nitrogen dioxide to form di-nitrogen trioxide, which remains dissolved in the dialkyl sulfoxide, passes through a pipe n into a secondary oxidation vessel G where it is reacted with oxygen or a gas containing oxygen introduced through a pipe t to reform nitrogen dioxide.

The gases leaving the oxidation vessel E, which substantially consist of nitrogen dioxide, nitrogen and oxygen, are led through a pipe p to a scrubbing tower F, preferably into the lower part thereof, into which the nitrogen dioxide solution running off the oxidation vessel G is introduced via a pipe o. In the scrubbing tower F, the nitrogen dioxide solution is increased in concentration by washing out the major part of the nitrogen dioxide contained in the gas originating from vessel E and is then led to the reactors A and D through pipes b and g respectively. The remainder of the nitrogen dioxide left in the waste gas is almost completely extracted by washing in the upper part of the scrubbing tower F by means of dialkyl sulfoxide fed in via pipe k. The waste gases leave the apparatus via pipe s.

Nitrogen monoxide or nitrogen dioxide in an amount required for setting the apparatus into operation can be introduced through a pipe r; any losses of nitrogen oxides which may occur in the process of the invention can be compensated by making up with fresh quantities of nitrogen oxides fed in through pipe r.

The herein described process may be varied in many ways. For instance it is possible to additionally feed to the reactor A through a pipe u oxygen or an oxygen-containing gas which reacts with the resulting NO to form nitrogen dioxide, and regenerates at least part of the nitrogen dioxide solution, thus increasing the capacity of the apparatus. It is further possible to combine the apparatus G, D, and E in a common reactor. In this case, care has to be taken that oxygen or a gas containing oxygen is admitted through pipe t at any rate sufficiently far below the entrance of pipe m, since otherwise the di-nitrogen trioxide solution is regenerated incompletely and the waste gases in the scrubbing tower F expel therefrom nitric oxide which is lost. Another modification of the process of the invention consists in feeding the required nitric oxides to other spaces, e.g. to the reactor A or D, or producing them in the apparatus from nitric acid which is preferably introduced into the reactor A.

The invention is further illustrated by the following example without being restricted thereto.

*Example 1*

The process described below was carried out in a laboratory apparatus constructed in accordance with the accompanying drawing, all parts of the apparatus including the pumps being made of glass. The dimensions of the apparatus may become apparent from the indication that a glass tube being 3 cm. in diameter and 1 m. in length, which was filled with Raschig rings of 3 mm., was used as the scrubbing tower F, while a 40 cm. long tube of the same diameter was used as the reactor D. Most of the individual parts of the apparatus were assembled by melting in order to avoid ground joints.

266 g./h. of dimethyl sulfide were fed in through pipe a, 3.5 l./h. of nitrogen through pipe h, 4.8 l./h. of oxygen (90%) through pipe u and 55 l./h. of oxygen (90%) through pipe t. 380 cc. of dimethyl sulfoxide were led off through pipe i; about 20% of this dimethyl sulfoxide was returned to the scrubbing tower F through pipe k. The waste gas led off via pipe s contained less than 0.2% by volume of nitric oxides; the nitric oxide proportion could be reduced to less than 0.1% by volume by feeding in more oxygen through pipe t or by the interposition of a holding tank of 5 liter capacity in pipe p. The yield of pure dimethyl sulfoxide was 97.3% of the theoretical.

I claim:

In a process for the production of dialkyl-sulfoxides by oxidizing in the liquid phase an excess of dialkyl-sulfides with a solution of nitrogen dioxide in the dialkyl-sulfoxide obtained as reaction product, wherein the nitric oxide evolved in the oxidation and the greater part of unreacted dialkylsulfide is separated from the reaction mixture by heating said mixture, the improvement which comprises passing a gas selected from the group consisting of nitrogen and nitric oxide through said mixture to pick up the remainder of the unreacted dialkylsulfide, separating from the obtained gas mixture a part of the dialkylsulfide by cooling, returning said part to the oxidation step, washing the other part of the gas mixture with a solution of nitrogen dioxide in dialkylsulfoxide to form a solution of nitrogen dioxide and dinitrogen trioxide in the dialkylsulfoxide, reacting said solution with an excess of free oxygen to oxidize said dinitrogen trioxide to nitrogen dioxide dissolved in said dialkylsulfoxide, reacting the nitric oxide evolved from said solution with an excess of free oxygen to form nitrogen dioxide, absorbing said nitrogen dioxide with dialkylsulfoxide and returning the obtained solution of nitrogen dioxide in the dialkylsulfoxide to the oxidation of the dialkylsulfide.

References Cited in the file of this patent

UNITED STATES PATENTS

| | | |
|---|---|---|
| 2,581,050 | Smedslund | June 1, 1952 |
| 2,702,824 | Wetterholm et al. | Feb. 22, 1955 |